March 10, 1970     D. STANKOVICH     3,500,312

SEQUENCE FLASHING SYSTEM FOR AUTOMOTIVE LAMPS

Filed April 8, 1966     2 Sheets-Sheet 1

DONALD STANKOVICH
INVENTOR.

BY Norman L. Chalfin
AGENT

March 10, 1970  D. STANKOVICH  3,500,312
SEQUENCE FLASHING SYSTEM FOR AUTOMOTIVE LAMPS
Filed April 8, 1966  2 Sheets-Sheet 2

DONALD STANKOVICH
INVENTOR.
BY Norman L. Chalfin
AGENT

United States Patent Office 3,500,312
Patented Mar. 10, 1970

3,500,312
SEQUENCE FLASHING SYSTEM FOR
AUTOMOTIVE LAMPS
Donald Stankovich, 6921 Corona Ave.,
Bell, Calif. 90201
Filed Apr. 8, 1966, Ser. No. 541,164
Int. Cl. B60q 1/00, 1/46; H03k 17/00
U.S. Cl. 340—67                                 11 Claims

ABSTRACT OF THE DISCLOSURE

A sequence flashing circuit system for automotive vehicles is disclosed in which the circuits are installable into existing multiple lamp circuits or adaptable to new equipment. Each of the circuits includes semiconductor switching means and a switching control circuit for timing the occurrence of the on-off operation of the circuits in a sequence following the occurrence of an initial operation of the directional indicator control lever. Means are also described in connection with a sequence control system to provide simultaneous operation of the lamps by-passing the sequence operation when the brake is operated.

---

This invention relates to automobile or other vehicular warning light systems, and more particularly to a semiconductor circuit system for operating the lamps of such lighting systems in a sequence.

In the usual automotive equipment there are indicating lights for warning purposes. In automobiles these are the brake lights, turn indication signal lights, and the red tail lights operated at night. In aircraft, wing and tail surface limit lamps are used, with different colors to locate right, left, and center portions of the craft. Similarly, marine craft have lighting devices for warning purposes.

The automobile turn signal indication systems generally include a switching means for selecting the direction indication desired, and a means of supplying power to the light or lights selected. The system includes a thermal circuit interrupter that causes the selected lamp to go on and off periodically. Up until recently, a number of vehicles were produced in which the tail turn indication lights were arranged in multiple assemblies where two or three lamps appeared together on each side of the rear of the automobile. When the circuit interrupter operates in such vehicles, both lamps in a two-lamp group, or all three lamps of a three-lamp group are flashed on and off simultaneously.

If the group of three lamps could be made to flash in a sequence from the innermost lamp towards the outermost lamp, the result would be an impression of a moving signal in the direction of the intended turn of the vehicle.

This invention contemplates a readily installable circuit means by which existing automotive equipment incorporating multiple lamp circuits can be modified to operate the lamps in a sequence flashing mode such as described above.

The novel circuit means of this invention is such that the method of installation simply requires the removal of the "hot" circuit wire to the lamp to be flashed and insertion of the circuit means between this wire and the lamp to be flashed. The new circuit system of the invention is capable of operating the three lamps in a sequence as described above, or may be arranged to provide alternate flashing of two lamp arrays as well.

Accordingly, it is an object of this invention to provide a circuit arrangement for insertion in series with existing lamp units of automotive turn indication or other lamp flashing arrangements of such vehicles so that the individual lamps of a group of such units may be flashed in sequence to indicate a direction or to provide a hazard warning.

It is a further object of this invention to provide a semiconductor circuit arrangement for flashing indicator lamps of an automotive vehicle in a sequence.

It is another object of the invention to provide an economical circuit means by which common groups of automotive turn indicator lamps, normally operated individually or simultaneously, may be made to operate in sequence, or alternately.

These and other objects of the invention will be more fully understood from the specification which follows in which several exemplary embodiments of the invention are described and of which the circuits are illustrated in the accompanying drawings. It is to be clearly understood that the illustrated and described embodiments herein may lead those skilled in the art to which this invention pertains to devise other emobdiments within the ambit of the appended claims, and therefore should not be considered as limiting the invention merely to those embodiments shown and described.

As has been briefly discussed above, the present invention contemplates a means by which plural automotive turn indicator signal lamps usually arranged in tandem for simultaneous operation may be operated in a sequence. The means of the invention is inserted in series with each lamp to be switched in a sequence. For example, where there are three lamps in a group on each side of the rear of the automotive vehicle, a unit of the invention will be connected in each of the two outer lamps of the group while the innermost lamp will remain connected to the original circuit source. A "T" connection element as further described below may be incorporated in the innermost lamp lead to provide a tap to the circuit devices according to this invention inserted in series with the other lamps in the group. A set as above described wll be required for the left group of lamps and another for the right group of lamps. A further innovation involved in the invention is provision for brake pedal operation whereby the delaying circuits which provide the sequencing of the lamps are by-passed to permit simultaneous operation of the lamps in response to the actuation of the brake pedal.

The invention as herein described is particularly adapted for use in the modernization of the turn indication flashing systems of automobiles of older vintage. It should, however, be obvious to those skilled in this art that new equipment may also incorporate the circuit and system of the invention herein described to provide sequence flashing of indicator lamps whether for turn indication, stop light, emergency warning, or other utility in vehicular lighting systems.

Figure 1:
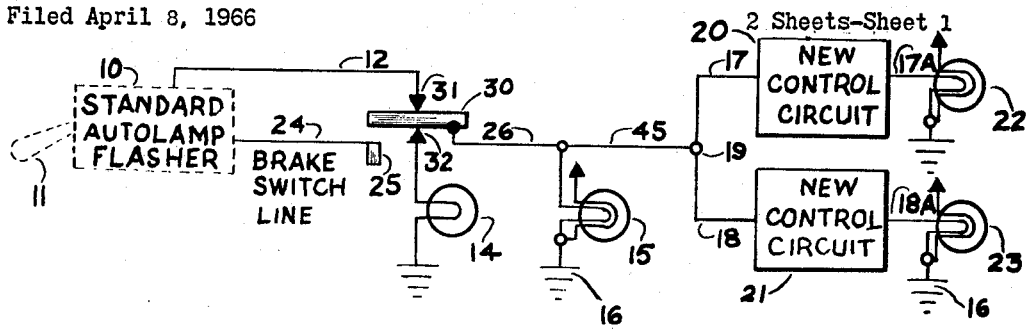
FIGURE 1 is a partially-block circuit diagram of the basic concept of the invention showing the generic form thereof.
Figure 2:
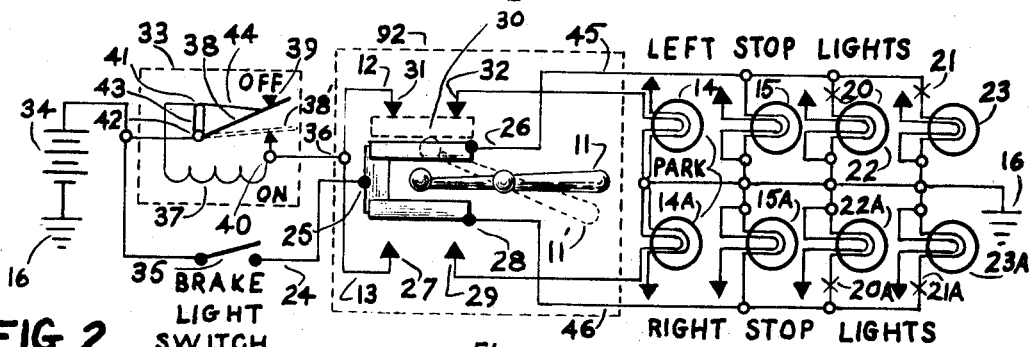
FIGURE 2 is a detailed circuit diagram of a typical automotive vehicle turn indicator system.

Referring now to FIGURE 1 the basic concept of the invention may be clearly seen to involve a standard autolamp turn-indicator-flasher 10 which is usually operated by a lever 11 on the steering column. The usual lamp flasher includes a left lamp output lead 12 and a right lamp output lead 13. For convenience of illustration and since the circuits are otherwise identical throughout this disclosure, only one of the lines such as 12/13 will be described in detail. It should be clearly understood that the opposite side is similarly connected with identical components of the invention since the turn indication circuits of the automobiles are bilaterally symmetrical, as shown in FIGURE 2. All of the other figures may also be considered in combination with FIGURE 2 so as to appreciate the relationship of the components of the new control circuits identified as blocks 20 and 21 in FIGURE 1.

In FIGURE 1, the lamp 14 is one of the front parking lamps on one side of the car and 15 is one of the rear turn indicators, brake light, and red tail light combinations. As may be seen in FIGURE 2, a typical turn indication, brake light, parking light and rear tail lamp system incorporates a pair of parking lights-front turn indicator lamps 14, 14a and pairs of rear turn indicator, braking indication, and tail light lamps 15, 15a, 22, 22a 23, 23a. These are connected as shown through the turn direction selector lever and fork arrangement 11, 30, the flasher unit 33 and brake light switch 35 to the automobile ignition battery 34.

In FIGURE 1 only a part of fork arrangement 30 is shown making contact with terminals 31 and 32. Lead 12 in FIGURE 2 may be seen to be connected to the ON terminal 40 of the flasher unit 33. This is the same connection 12 shown in FIGURE 1 making contact through fork 30 to terminal 32 to place parking lamp 14 into the circuit and to connect with terminal 26 fixed to fork 30 thereby to apply current to rear lamp 15. At lamp 15 lead 45 branches to leads 17 and 18 at junction 19.

Lead 17 connects to new control circuit 20 and lead 18 to new control circuit 21, each returning to their respective lamp circuits 22, 23 through continuing leads 17a and 18a. All of the lamps 14, 15, 22, 23 and their bilateral counterparts complete their return circuits to ground at 16.

Prior to consideration of the operation of the invention incorporated in new control circuits represented by blocks 20, 21 and further detailed below, the operation of the standard flasher system of FIGURE 2 should be understood. In common with all such flasher systems the operation is controlled by a turn direction selection lever such as 11 which provides a means such as fork 30 with a motion to complete the interconnection of thermal light flasher 33 through the selected direction indicating lights such as 14 and the combination of lamps 15, 22 and 23. Thermal light flasher 33 has a heater coil 37 which is connected between one terminal of battery 34 and the selected turn direction indication lamp group. As a result of this series connection the current from battery 34 passes through coil 37 to the lamp group 14, 15 etc., causing coil 37 to heat up. Contact arm 38 articulating on terminal 42 of the flasher coil is being held in contact with terminal 39 by the tension of tungsten wire 44 supported by insulated support 43. As coil 37 heats, the thermal expansion of the tungsten wire releases the tension to move arm 38 into the dashed line, or ON, position thereof shown at 38' to contact terminal 40 of coil 37. The coil 37 is thereby shorted and it cools, increasing the tension on thermal elements 44 and thereby returning arm 38 to its original or OFF position. Whereupon, as long as lever arm 11 holds fork 30 in contact with either 27, 28, 29 or 31, 26, 32, the on-off operation of flasher unit 33 will continue periodically.

In FIGURE 2 at points marked by the symbol X in the leads from lines 45 and 46 to the lamps 22, 22a, 23 and 23a, there is indicated the places where the new control elements 20, 20a or 21, 21a according to this invention may be inserted into an existing system such as that shown typically in FIGURE 2. Referring to FIGURE 1 the control units 20, 21 for a single direction indicator array (that is, left- or right-turn indication) are shown. In each system additionally as indicated in FIGURE 2 another pair of control circuit units, there indicated as 20a and 21a, will be used.

Figure 3:
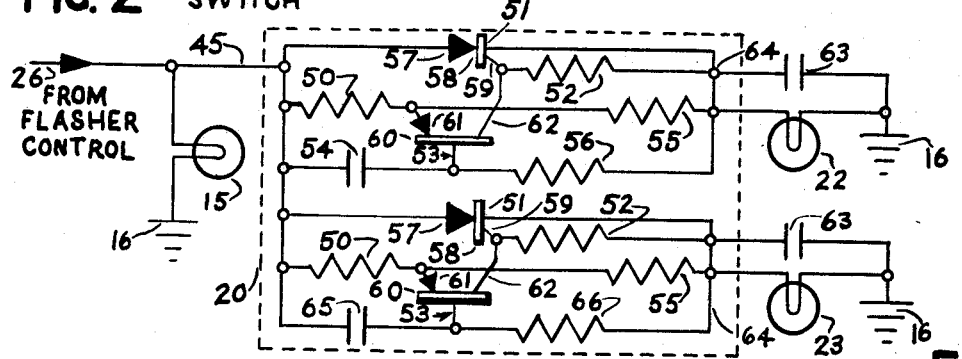
FIGURE 3 is a partially-block circuit diagram of an embodiment of the invention employing transistors as triggering circuit elements.

A typical circuit diagram of a pair of control circuit units such as 20-21 is shown in FIGURE 3. These are enclosed in dashed blocks. In the circuit of FIGURE 3 and in the other circuits described hereinafter wherever circuit elements appear which are the same as those in previous figures and perform the same functions they bear the same reference characters. Thus, in FIGURE 3, within block 20 are included a silicon controlled rectifier (SCR) 51 and a transistor 53 connected as parallel elements in series with the line 45 and lamp 22. In block 21 a similar arrangement of transistor 53 and SCR 51 are connected in series with line 45 and lamp 23.

The anode 57 of SCR 51 is connected to line 45. The cathode 58 of SCR 51 is connected to the "hot" lead 64 of lamp 22 (in block 20) or 23 (in block 21). In either case the lamps 22, 23 return to ground at 16. The gate electrode 59 of SCR 51 is connected to the collector 62 of transistor 53.

Transistor 53 is of the PNP type. A resistor 52 is connected between the collector 62 of transistor 53 and lead 64. The emitter 61 thereof is connected to the junction of resistors 50 and 55 which are connected in series between line 45 and lead 64. A capacitor 54 is connected between lead 45 and the base 60 of transistor 53 and a resistor 56 is connected between base 60 and lead 64. A capacitor 63 is connected between lead 64 and ground 16. In the present device ground is considered the negative pole of the circuit and the lead 45 the positive pole. Thus the base emitter junction of transistor 53 is forward biased through resistor 56 and resistor 50 and base 60 is forward biased by resistor 56 except while capacitor 54 is not charged. This occurs upon the application of voltage to line 45 which results when fork 30 (FIGURE 2) closes contacts 31, 32. Similarly, on the opposite turn indication side, line 46 will have voltage applied when fork 30 makes contact with terminals 27, 29.

The application of voltage to line 45, then, charges capacitor 54 (and also 65 as later described). SCR 51 is normally open at this time. The base 60 of transistor 53 and capacitor 54 are at the same potential as line 45 while the emitter 61 is more negative due to the division of voltage by resistors 50 and 52. With biases thus applied, transistor 53 is not conducting. Capacitor 54 charges through resistor 56 until the value of the bias at base 60 is approximately .7 volt with respect to the emitter, whereupon transistor 53 conducts strongly. The values of resistor 56 and capacitor 54 are chosen to produce a particular time delay as further discussed below. Upon conduction of transistor 53 the voltage at collector 62 increases through resistor 52 to the level of transistor emitter 61 so that gate 59 of SCR 51 is triggered and the SCR becomes conducting to light lamp 22. While SCR 51 is conducting, capacitor 63 charges up, and when the flasher 33 goes to the off position its discharge extinguishes the SCR 51. This is necessary because an SCR device is of the all or none character and in a completed circuit remains "on" until the power is removed, or the polarity of the potential across it is reversed.

The components in box 21 are the same as those in box 20 and, except for the fact that the RC circuit elements (resistance-capacitance) 65–66 are of different values than the corresponding RC elements 54–56 in box 20; therefore, the circuit of box 21 and box 20 operate in exactly the same manner. Only the charging time for the RC elements 54–56 and 65–66 differ from one another. However, circuit of box 20 and 21 may be identical if circuit of box 21 is in series with circuit of box 20. Thus, when flasher 33 applies voltage to the line 45, lamp 15 is excited immediately, and is also applied to transistors 53 and to RC elements 54–56 and 65–66. The former charges up first to turn on lamp 22. The delay for RC elements 65–66 is longer and thereafter turns on lamp 23. The firing order is lamp 15, then lamp 22, and then lamp 23.

Figure 4:
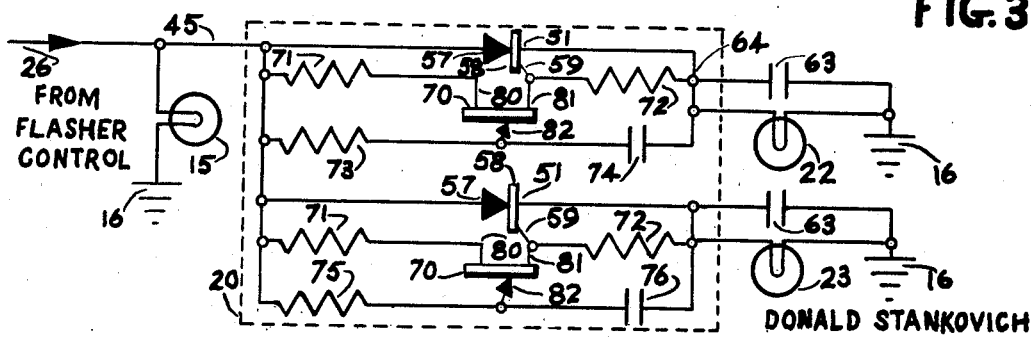
FIGURE 4 is a schematic circuit diagram similar to FIGURE 3 in which unijunction transistor devices are employed as the triggering elements.

In FIGURE 4, as an alternative circuit, a unijunction transistor (UJT) 70 is used to trigger SCR 51. The unijunction transistor is normally non-conductive when current is applied to line 45. The first base 80 of UJT 70 is connected through a resistor 71 to the positive end of the circuit at lead 45 while resistor 72 is connected from the junction of second base 81 of UJT 70 and gate 59 of SCR 51 to the negative end of the circuit represented by line 64 and lamps 22/23. Resistor 73 and capacitor 74 and resistor 75 and capacitor 76 form respective RC timing elements for UJT emitters 82.

When voltage is applied to line 45 of the circuit of FIGURE 4 the UJT devices 70 and the SCR devices 51 are non-conductive. Capacitors 74 and 76 charge up until they reach the firing potential of UJT 70 and cause conduction through resistors 71 and 72. The drop across resistor 72 places gate electrode 59 of SCR 51 nearer the positive potential and SCR becomes conductive to complete the circuit through first lamp 22 and later lamp 23 in the manner described previously in connection with FIGURE 3. Thus, the firing order is again lamp 15, 22, 23.

Figure 6:
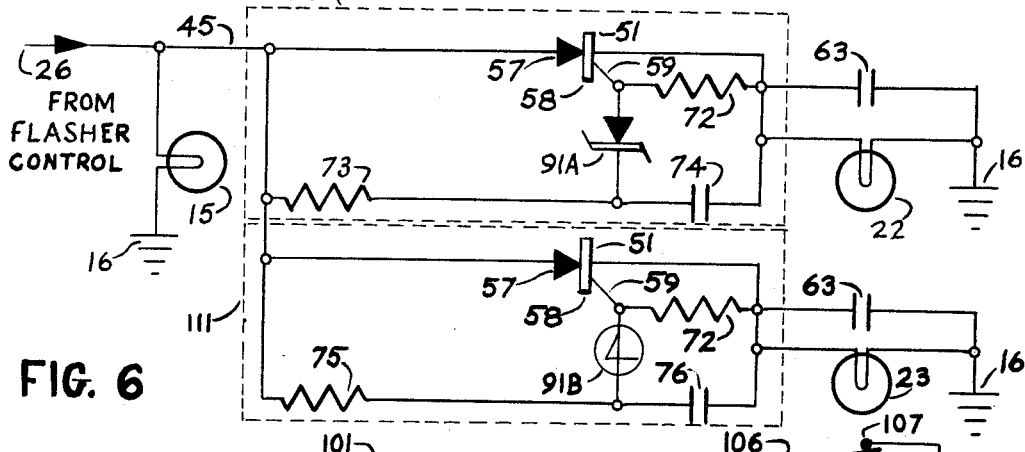
FIGURE 6 is a circuit diagram similar to that in FIGURE 4 wherein other circuit elements such as four-layer diodes, or avalanche diodes are employed to perform the triggering functions thereof.

There are other triggering circuit arrangements by which the same action above described in connection with FIGURES 3 and 4 may be accomplished, which will occur to those skilled in the arts appertaining to automotive lighting systems and semiconductor circuits and devices, in the light of the above disclosure as shown in FIGURE 6.

It has been pointed out above that the circuits of flashers of well known design and operation are used with the invention. In such circuits, as may be seen in FIGURE 2, the brake pedal switch 35 on line 24 between battery 34 and terminal 25 on fork 30 of switch lever 11 ordinarily feeds directly into both of the rear indicator lamp arrays. Terminals 26, 28 and 25 are all on fork 30, so that closing switch 35 by application of the brake pedal completes the battery circuit to both left and right stop lights 15, 15a, 22, 22a, 23, 23a. The front parking lights 14, 14a are not actuated since the circuit is not completed to them. When braking action places the voltage to line 45 for lamps 15, 22, 23, for example, to complete the circuits of FIGURES 3 and 4, the brake lights will light up in sequence but will not extinguish for the reason that SCR devices are all or none devices and once fired remain conductive until the polarity is reversed or current entirely removed. Since there is no periodic interruption of the circuit when the brake (not shown) is engaged in closing switch 35, the lamps will go on in sequence and remain on so long as the brake pedal (not shown) holds switch 35 closed.

Figure 5:
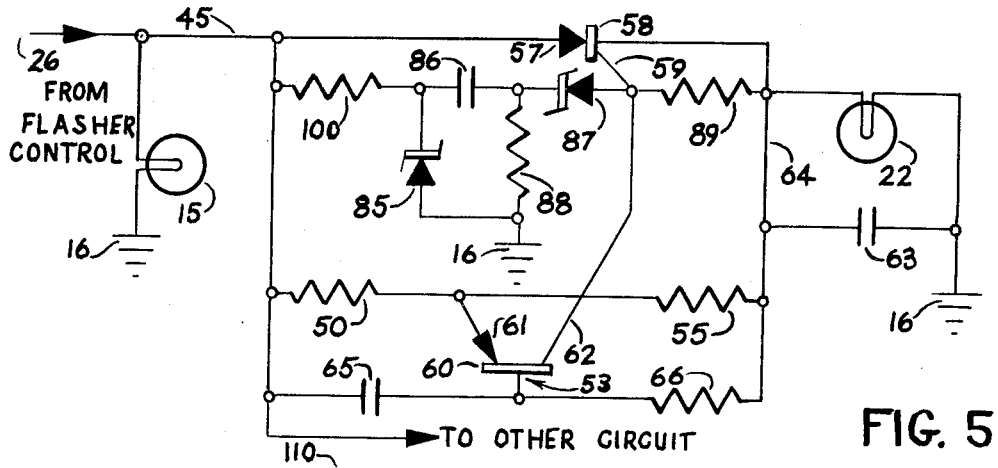
FIGURE 5 is a circuit diagram of a circuit control element according to the invention which provides circuit means selectively responsive to the brake pedal switch operation or turn indicator lever operation of an automotive vehicular turn indication lamp system to permit simultaneous or sequential operation of the lamps.

Circuits to bypass the flashing action and sequence operation when the brake switch is operated are shown in FIGURE 5.

In FIGURE 5 the same transistor (53) circuit as that shown in FIGURE 3 is used to trigger SCR 51. However, collector 62 thereof has in addition to its load resistor 89 a series-connected Zener diode 87, and a capacitor 86 connected to resistor 100 which in turn is terminated to the line 45. A shunt Zener 85 connects from terminal 102 to ground. A load resistor 88 connects from the junction of Zener 87 and capacitor 86 to ground.

The operation of the circuit of FIGURE 5 is best described as follows: When a brake light switch (35) closure occurs, the voltage applied to line 45 is normally higher than through flasher 33, FIGURE 2, when the lever switch fork 30, FIGURE 2, is used to complete the circuit. This is because with the flasher the resistance of the flasher coil 37 is in the circuit initially. When the switch 35 is closed by the brake pedal (not shown), Zener diode 85 limits the voltage applied to a predetermined value and capacitor 86 is charged through resistor 88. Since the capacitor contains no charge, the breakdown potential of Zener diode 87 is exceeded and the appropriate value of gate potential is applied to gate electrode 59 of SCR 51 to complete the circuit to lamp 22.

When flasher 33 is operated as is the case when lever 11 actuates fork 30, a lower voltage is applied to the line 45 due to the flasher coil 37 resistance. Capacitor 86 is charged through resistor 88 and the breakdown potential of Zener diode 87 is not exceeded. When the flasher 33 switches to the ON position and, due to the charge present on capacitor 86, the voltage applied to the Zener diode 87 does not exceed the avalanche potential, the time delay action of the RC elements can take effect through transistor 53.

While only a single lamp 22 is shown in FIGURE 5, it should be clear from the preceding figures and discussion that the same connection technique is available for multiple lamp arrays as indicated with respect to FIGURE 2.

In FIGURE 6 there is shown how an avalanche diode 91A within block 110 shown dashed-in, or a four-layer diode 91B within block 111 also shown dashed-in can be used as the triggering elements for the SCR's 51, 57, 58, 59 in the respective above-identified dashed-in blocks 110, 111.

In essence each of the circuits within blocks 110, 111 respectively operates on the same principles enumerated above with respect to the FIGURES 3, 4 and 5 described above.

Figure 7:
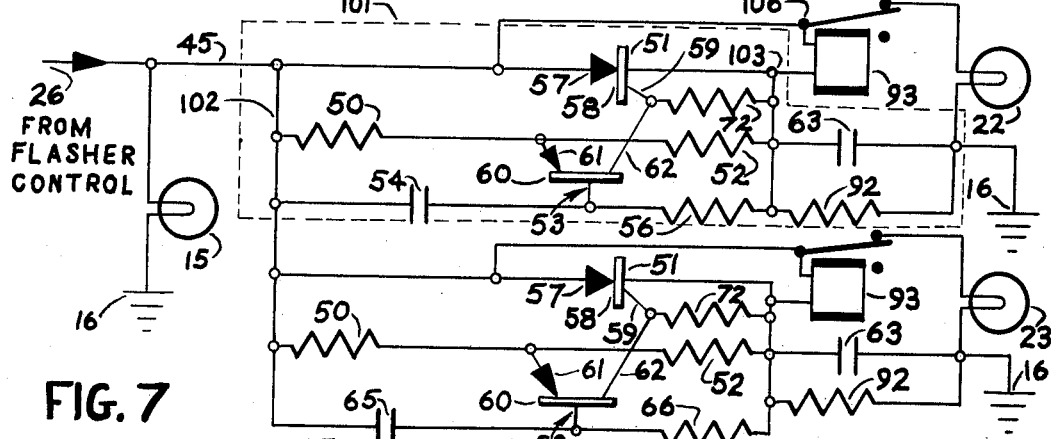
FIGURE 7 is a block diagram showing a typical installation utilizing only one unit of the invention in conjunction with two relays to perform the required functions.

The circuit of FIGURE 7 operates as follows: When the flasher is actuated by operation of switch 11, the voltage from battery 34 is applied to line 45. Both relays 93 pull in. The time for the relay to pull in is between 2 and 3 milliseconds. This is insufficient time to excite the lamps. When a relay such as 93 pulls in, it disconnects the lamps associated with it. Therefore, only lamp 15 is on. The R-C time constant circuit (54, 56) fires the SCR 57. The SCR 57 shorts out the relay 93 and resistor 92 limits the current through the SCR 57. The stored energy in the relay coil of relay 93 dissipates and drops back to the original state, thus turning on lamp 22.

Similarly, the time constant of R-C units 65, 66 turns on transistor 53 and fires the SCR at a specific time later, which turns on lamp 23.

When the flasher turns off, the SCR's are turned off by the same method as described in the discussion above related to FIGURES 3 and 4. Capacitor 63 provides the charge to turn off SCR's 57.

Figure 8:
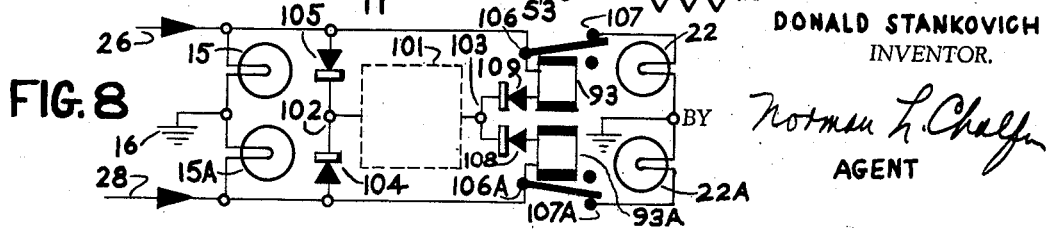
FIGURE 8 is a schematic and block diagram showing an alternative form of the circuit of FIGURE 7 involving only one of the triggering circuit means of FIGURE 7.

FIGURE 8 shows how a single triggering circuit here designated as 101 can be used to actuate a pair of relays such as 93, 93A alternately so that lamps 22, 22A on opposite sides of the car may be flashed alternately. The block designated as 101 in FIGURE 8 has been shown in FIGURE 7 as a dashed-in circuit enclosure. It should be obvious from the previously described circuits that any of those circuits for triggering an SCR such as 57 which have been described can be used in the same manner as the circuit shown in block 101 of FIGURES 7 and 8.

Referring back to FIGURE 2 in this connection it can be seen that when lever 11 selects either a left or right flashing condition, either line 26 or line 28 is energized from battery 34 with the interruption provided by flasher unit 33 (FIGURE 2) or unit 10 of FIGURE 1. Assuming that line 28 has been energized in this way, lamp 15a will start its flashing operation also diode 104 will conduct current to triggering circuit 101 through junction point 102. Diode 105 is back-biased at this time and does not conduct. Relay 93A as a result is energized and contacts 106A and 107A which were normally closed are opened and as above described in connection with FIGURE 7 the time is insufficient for lamp 22a to have been excited. Then as has been described in connection with FIGURE 7, the action of the circuit 101 shorts the relay, resulting in its being de-energized, and lamp 22a is now excited to light and be extinguished again in a sequence as previously described. Lamp 22 is unaffected due to the action of diode 109 which prevents energizing relay 93. If, on the other hand, line 26 had been energized, lamps 15 and 22 would be flashed sequentially instead of 15A and 22A, since diodes 104 and 108 are back-biased at this time. This should be obvious from the previous discussion.

Any of the triggering circuits hereinabove described in connection with the preceding figures can be used in the box designated as 101.

There have been described hereinabove a series of circuit arrangements according to this invention involving semiconductor devices by which turn indicator lamp arrays can be made to flash in sequence. The circuits include SCR switched control circuits triggered by either a PNP transistor as in FIGURE 3, a unijunction transistor as in FIGURE 4, or four-layer diode or avalanche device as in FIGURE 6, in conjunction with a resistance capacitance time delay network. Where more than one lamp is in the array of lamps to be flashed, the time delays of the respective control circuits are successively longer.

In each lamp to be flashed a new control circuit according to the invention as described above is inserted in series with the "hot" lead thereto so that installation is merely a matter of removing the wire to the lamp and inserting the new circuit according to this invention between the wire and the selected lamp. In this way both new equipment and old equipment may be supplied with the new circuit according to this invention.

What is claimed is:
1. In an automotive turn indicating lamp system including a plurality of lamps normally connected in parallel between an "on" circuit connection of a turn indicator lever and a common ground return connection, a semiconductor sequence flashing circuit inserted in series into the lead between said "on" connection and all but one of said plurality of lamps, said circuit comprising:
   at least a silicon controlled rectifier including a cathode and anode and a trigger electrode, the cathode and anode being connected in series with the lead from the "on" circuit connection of the turn indicator lever and a selected one of the plurality of lamps, the trigger electrode being connected through a resistor to the cathode return side of the series connection, so as to maintain the silicon controlled rectifier normally nonconductive;
   at least a normally nonconductive switching semiconductor device connected between said trigger electrode and said "on" circuit connection;
   a biasing network connected to said switching semiconductor device to maintain said device normally nonconducting; and
   a time delay charging circuit connected to said switching device so as to render said switching device conductive after a predetermined time interval after the operation of the turn indicator lever ann thereby triggering said silicon controlled rectifier to light the selected one of said lamps by becoming conductive in response to the switching device becoming conductive.

2. The semiconductor circuit system defined in claim 1 wherein said time delay circuit is a resistance and a capacitance connected in series and the series connection thereof connected in parallel with said silicon controlled rectifier.

3. The semiconductor circuit system defined in claim 1 wherein said normally nonconductive semiconductor device is a transistor of the PNP type having an emitter, a collector and a base, said collector connected to said trigger electrode and said time delay charging circuit connected with said base.

4. The semiconductor circuit system defined in claim 1 wherein said normally nonconductive switching device is a unijunction transistor having a pair of bases and an emitter and wherein said emitter is connected with said time delay charging circuit and one of said pair of bases is connected with said trigger electrode.

5. The semiconductor circuit system defined in claim 1 wherein said normaly non-conductive switching device is an avalanche diode.

6. The semiconductor circuit system defined in claim 1 wherein said normally non-conductive switching device is a four-layer diode.

7. The semiconductor circuit system defined in claim 1 wherein are included a plurality of silicon controlled rectifiers and normally non-conductive semiconductor switching devices and wherein each time delay charging circuit of each respective normally non-conductive semiconductor switching device has a larger time delay interval than its next preceding one, so that when each respective lamp is connected therewith it will flash at a later time than its next preceding one.

8. In an automotive vehicle lamp flashing system having a plurality of lamps normally connected in parallel and normally operated simultaneously, a lamp switching circuit connected in series with each respective one of said plurality of lamps beyond the first one of said plurality, each said lamp switching circuit comprising:
   a normally open silicon controlled rectifier having an anode, a cathode and a gate electrode, said anode connected to said first lamp, said cathode connected to one of the other lamps;
   a normally non-conductive transistor device including collector, a base and an emitter, said collector connected to said gate electrode;
   a collector bias resistor connected between said gate electrode and said cathode of said silicon controlled rectifier;
   a voltage divider resistance network connected in parallel with said silicon controlled rectifier and a tap on said voltage divider connected to said emitter; and
   a series connected resistance-capacitance network of predetermined values connected in parallel with said silicon controlled rectifier and having a junction connected to said base;
   whereby when said flashing system is operated said first lamp is excited and said resistance-capacitance network charges in a time interval determined by said predetermined values whereupon said transistor device become conductive to result in a change in voltage on said gate electrode due to the voltage drop across said collector bias resistor which turns on said silicon controlled rectifier to apply current to the selected one of the lamps beyond said first lamp to which said respective lamp switching circuit is connected, the predetermined values of said resistance-capacitance networks of each of said circuits providing a different time delay interval so that the respective lamps are excited through the respective silicon controlled rectifiers in series therewith in a sequence.

9. In an automotive vehicle lamp flashing system having a plurality of lamps normally connected in parallel and normally operated simultaneously, a lamp switching circuit connected in series with each respective one of said plurality of lamps beyond the first one of said plurality, each said lamp switching circuit comprising:
- a normally open silicon controlled rectifier having an anode, a cathode and a gate electrode, said anode connected to said first lamp, said cathode connected to a selected one of the other lamps;
- a normally non-conductive unijunction transistor including two bases and an emitter, one of said bases being connected to said gate electrode;
- a bias resistor connected from said base and gate electrode connection to said cathode of said silicon controlled rectifier;
- a second bias resistor connected between the other of said bases of said unijunction transistor and the anode of said silicon controlled rectifier; and
- a series connected resistance and capacitance network of predetermined values connected in parallel with said silicon controlled rectifier, the junction of said resistance and capacitance being connected to said emiter of said unijunction transistor;
- whereby when said flashing system is operated, said first lamp is excited and said resistance-capacitance network charges in a time interval determined by said predetermined values whereupon said unijunction transistor becomes conductive to result in a change in voltage on said gate electrode due to the voltage drop across said first named base bias resistor which turns on said silicon controlled rectifier to apply current to the selected one of the lamps beyond said first lamp to which said respective lamp switching circuit is connected, the predetermined values of said resistance and capacitance networks of each of said circuits providing a different time delay interval so that the respective lamps are excited through the respective silicon rectifiers in series therewith in a sequence.

10. In an automotive turn indicator flashing system having bilaterally symmetrical plural lamp arrays including a front parking lamp, and a plurality of rear lamps in each of the elements of said bilaterally symmetrical lamp arrays, a semiconductor circuit means connected to each of as many as one less than the number of lamps in said plurality of rear lamps, each of said circuit means including:
- a silicon controlled rectifier;
- a normally non-conductive device connected with said silicon controlled rectifier and with the remaining one of said rear lamps and adapted to be responsive to the initiation of operation of said remaining one of said rear lamps to trigger said silicon controlled rectifier to actuate another of said rear lamps;
- a resistance-capacitance time delay network coupled with said non-conductive device to delay its triggering action following said initiation of said operation of said remaining one of said rear lamps in accordance with the time delay characteristic of the resistance-capacitance network, each said network in each of the semiconductor circuit means inserted in a respective lamp circuit having a longer delay than that in a preceding lamp circuit;
- and a by-passing circuit connected with said normally non-conductive device so as to override the time delay action of said time delay network to trigger said silicon controlled rectifier immediately upon initiation of operation of said remaining one of said rear lamps,
- whereby said rear lamps are normally actuated to operate in a sequence following the initiation of said remaining one of said rear lamps at a rate determined by the respective time delays of said time delay networks in said circuits, and all lamps are operated simultaneously when said by-passing circuit is actuated in response to a brake pedal operation of said turn indicator flashing system to override the flashing thereof and provide continuous lighting thereof during the operation of said brake pedal.

11. In an automotive lamp flasher circuit wherein a plurality of turn indicator lamps are positioned on one side of the rear of an automobile and a similar plurality on the other side thereof, and each said plurality is normaly flashed simultaneously, circuit arrangements for flashing each one of each of said plurality of turn indicator lamps in a sequence, each of said circuit arrangements including:
- a silicon controlled rectifier including a gate electrode and connected in series with each one, save one, respectively, of the lamps in the respective plurality of turn indicator lamp circuits of a vehicle; and a normally non-conductive semiconductor device including biasing and time delay means connected with said semiconductor device and connected in parallel with said silicon controlled rectifier, one of the electrodes of said semiconductor device being coupled to said gate electrode;
- said semiconductor device adapted to be responsive to said time delay means to become conductive after a predetermined time, thereby to trigger said silicon controlled rectifier and to apply current to the respective lamp after a time delay period determined by said time delay means, and one of each of said circuit arrangements including a silicon controlled rectifier and a semiconductor device as above defined being connected in series with one of each of said plurality of lamps, except for the first of said plurality of lamps, and each successive one of said circuit arrangements being connected at the junction of the next preceding of said circuit arrangements and the next preceding one of said turn indicator lamps to which said next preceding circuit arrangement is connected.

References Cited

UNITED STATES PATENTS

| 3,113,293 | 12/1963 | Breese et al. | 340—83 X |
| 3,313,981 | 4/1967 | Kratochvil | 315—210 |
| 3,376,472 | 4/1968 | Taylor et al. | 340—83 X |

JOHN W. CALDWELL, Primary Examiner

KENNETH N. LEIMER, Assistant Examiner

U.S. Cl. X.R.

307—41, 252, 293; 315—210; 340—82